United States Patent [19]
Roberts

[11] Patent Number: 6,146,150
[45] Date of Patent: Nov. 14, 2000

[54] CIRCUIT CARD WITH SEPARATE INTERFACES FOR DIFFERENT BUS ARCHITECTURES

[75] Inventor: Norman King Roberts, Loxahatchee, Fla.

[73] Assignee: International Business Machines Corporation, Armonk, N.Y.

[21] Appl. No.: 09/198,976

[22] Filed: Nov. 24, 1998

[51] Int. Cl.[7] ............................. H01R 12/00; H05K 1/00
[52] U.S. Cl. ................................ 439/55; 439/62
[58] Field of Search ................... 439/55, 59, 61, 439/62, 79, 80, 170, 630

[56] References Cited

U.S. PATENT DOCUMENTS

| | | | |
|---|---|---|---|
| 4,241,381 | 12/1980 | Cobaugh et al. | 361/413 |
| 4,885,482 | 12/1989 | Sharp et al. | |
| 5,099,394 | 3/1992 | Hood et al. | 361/413 |
| 5,119,498 | 6/1992 | McNeill et al. | |
| 5,162,675 | 11/1992 | Olsen et al. | |
| 5,163,833 | 11/1992 | Olsen et al. | |
| 5,197,887 | 3/1993 | Davidge et al. | |
| 5,440,755 | 8/1995 | Harwer et al. | |
| 5,572,688 | 11/1996 | Sytwu . | |
| 5,717,533 | 2/1998 | Poplawski et al. | 361/752 |

OTHER PUBLICATIONS

*IBM Technical Disclosure Bulletin*, Convertible Card for Multiple Bus Architecture, vol. 36, No. 02. Feb. 1993, pp. 435–437.

*Aptiva Handbook*, International Business Machines Corp., 1998, pp. 8–2 through 8–5. No Month.

Scott Mueller, *Upgrading and Repairing PCs*, Que, 1996, pp. 103–112. No Month.

*Primary Examiner*—Lincoln Donovan
*Assistant Examiner*—Kyung S. Lee
*Attorney, Agent, or Firm*—Ronald V. Davidge; Richard A. Tomlin

[57] ABSTRACT

A circuit card assembly includes a circuit card having a first type of connector extending along one of its longitudinal edges and a second type of circuit connector extending along its other longitudinal edge, so that the card assembly can be plugged into one type of computer bus or inverted and plugged into a second type of computer bus. Provisions are made for inverting a card bracket attached to an end of the card assembly, so that it is correct for both types of installations. In either case, the I/O connector(s) (if any) of the card assembly extend through the bracket for the connection of external cable(s).

15 Claims, 3 Drawing Sheets

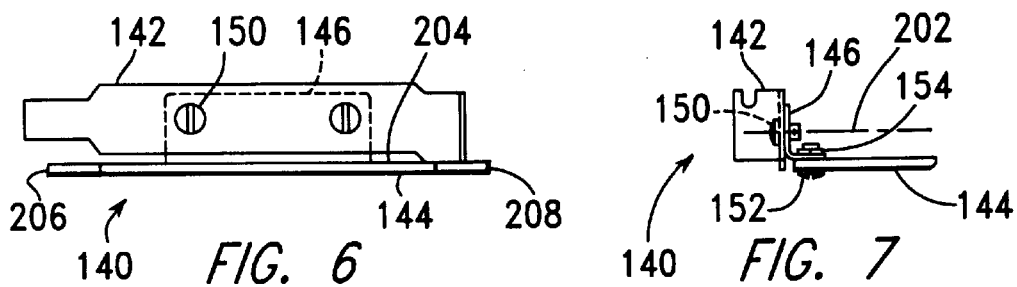
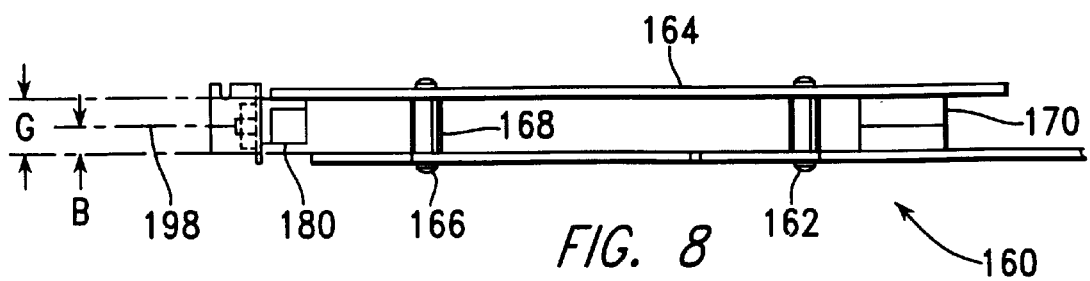
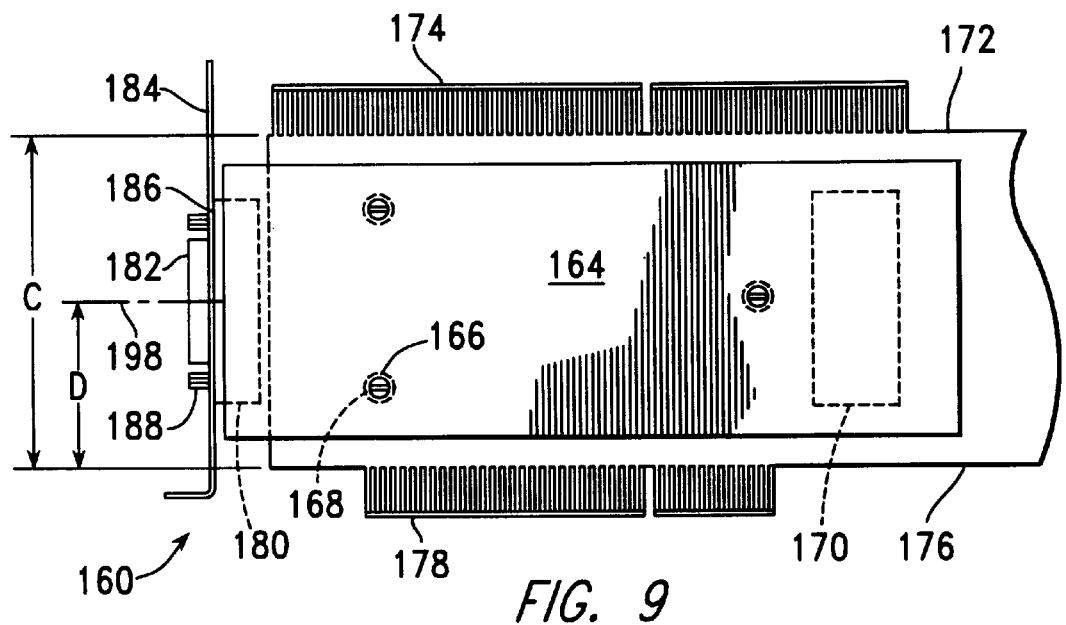
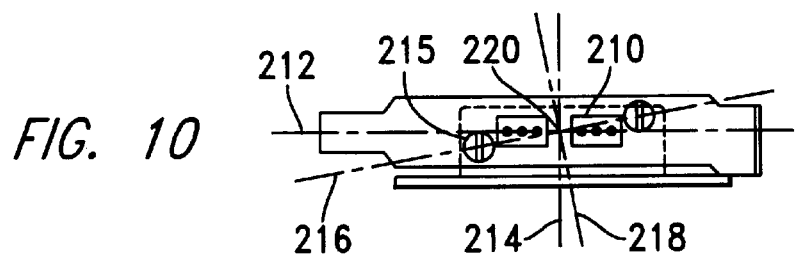

CIRCUIT CARD WITH SEPARATE INTERFACES FOR DIFFERENT BUS ARCHITECTURES

FIELD OF THE INVENTION

The present invention relates to adapter cards for personal computers, and, more particularly, to adapter cards which may be plugged into two different types of computer busses.

BACKGROUND OF THE INVENTION

Except for laptop systems, personal computers are almost always configurable by means of changing and adding adapter cards which are plugged into the system bus. The system bus includes a number of lines including various signals, together with electrical ground lines and lines supplying power at one or more voltage levels. An important part of the development of computer systems has been the development of standardized, efficient versions of the system bus. The specifications of a bus, which are collectively called an "architecture," describe the type of connectors to be used, the types of signals, including timing conditions, the voltage levels, and the connector positions used to provide voltage levels and grounds, and the allowable physical conditions of cards. The most popular type of system bus is now known as the ISA (Industry Standard Architecture) bus. Another significant type of bus is the local bus architecture of the PCI (Peripheral Component Interconnect) bus.

FIG. 1 is a block diagram of a prior-art personal computer including both a PCI local bus 10 and an ISA system bus 12. The processor 14 is connected to cache memory 16 and to a bridge/memory controller 18 by means of a processor bus 20. The bridge/memory controller 18 in turn provides an interface to both the PCI bus 10 and the random access memory 22. The PCI bus 10 is connected to the ISA system bus 12 through an interface circuit 24. The PCI bus 10 also includes a number of card slot connections 26, through which connections with adapter cards configured particularly for use with a PCI bus are made. Similarly, the ISA bus 12 includes a number of card slot connections 28, through which connections with adapter cards configured particularly for the ISA bus are made.

FIG. 2 is a fragmentary vertical cross-section of a computing system having the configuration of FIG. 1. The system board 29 includes ISA connectors 30, 32, through which the ISA bus 12 is provided, and connectors 34, 36, through which the PCI bus 10 is provided. Each connector 30, 32, 34, 36 includes a number of contact springs 37 and a key 37a. A number of ISA adapter cards 38 are plugged into the ISA connectors 30,32, while a number of PCI adapter cards 40 are plugged into the PCI connectors 34, 36. The PCI connectors 34, 36 are displaced inward, in the direction of arrow 39, from the ISA connectors 30, 32, and the PCI connectors 34, 36 are smaller, having closer spacings between adjacent electrical contacts.

The system board 29 is mounted within a frame 42 including a slotted bracket 44 through which connections are made between external cables 46 and the adapter cards 38, 40. Each I/O connector 48 on an ISA adapter card 38 for attachment to an external cable 46 having a cable connector 49 extends in the direction of arrow 50 from the card 38, with electrical connections usually being made between various conductive layers in the card and pins extending through holes within the card material. Each ISA adapter card 38 also includes a card bracket 54, extending along the internal side 56 of the slotted bracket 44 to close the slot 58 within the bracket 44 when the card 38 is installed within an associated ISA connector 30, 32. The connectors 48 extend through holes within the card brackets 54. Some ISA adapter cards do not need connections to external cables 46, and thus include brackets without holes for cable connectors. A central slot 60 within the slotted bracket 44 is covered in this way by either a card bracket 54 of an ISA card, plugged into ISA connector 32, or alternately a card bracket 62 of a PCI card 40 plugged into PCI connector 36. To make this possible, the card bracket 62 and connector 66 of each PCI card 40 extends opposite the direction of arrow 50 from the PCI card 40.

Each card bracket 54 is fastened to an associated ISA card 38 by means of a pair of rivets or screws 70 extending through tabs 72 formed as parts of the bracket 54. Similarly, each card bracket 62 is fastened to an associated PCI card 40 by means of a pair of rivets or screws 74 extending through tabs 76 formed as parts of the bracket 62. Slots 58, 60 which are not occupied by brackets 54 of ISA cards 38, or by brackets 62 of PCI cards 40, are closed by filler plates 80. Each bracket 54, 62 and each filler plate 80 is held in place by a screw 82 engaging a threaded hole (not shown) within a bracket locating surface 84 of the slotted bracket 44.

The ISA bus was introduced in an 8-bit version running at 4.77 MHz with the original IBM Personal Computer in 1981. In 1984, a 16-bit version of the ISA bus was introduced with the IBM Personal Computer/AT, running at 8 MHz. Multiplying this speed by the 16-bit data width, indicates that the bus runs at 128 megabits per second. However, since the bus requires at least 2 cycles to transfer data, the actual data transfer rate is at most 64 Megabits per second, or 8 MBytes per second.

The specification for the PCI bus was released in June, 1992, and updated in April, 1993. Information is transferred across the PCI bus at 33 MHz and at the full data width of the processor. For example, when the PCI bus is used with a 32-bit processor, the bandwidth is 1,056 Megabits per second, or 132 MBytes per second. The PCI bus, implemented as shown in FIG. 1, is called a local bus, because it provides a way for external devices, such as adapter cards, to access the processor bus, which is local to the processor. The PCI bus used in this way is also called a mezzanine bus, because it adds another layer to the traditional configuration, in which the system bus was connected to the processor bus through bus controller chips.

The primary advantage of the ISA bus is its widespread availability, being included as the system bus within almost every "IBM-compatable" personal computer. Almost any adapter card function which is available for personal computers is available with an ISA interface. The primary disadvantage of the ISA bus is its lack of speed. This problem can be traced to the original Personal Computer, in which the system bus extending to I/O card slots operated at the same speed as the processor bus. Since then, with advances in processor chips, processor bus speeds have significantly increased, but it has been impossible to provide significant increases in the speed of the ISA bus because of the large inventory of adapter cards which cannot operate at significantly higher speeds. Nevertheless, the ISA bus continues to be used, even in high-performance personal computer systems, because of its relatively low cost, because it can be used to take advantage of the large number of available adapter cards, and because many I/O functions occur at speeds slower than that of the ISA bus, so that an increase in bus speed would not result in a similar increase in system performance.

An important advantage of the PCI bus is its speed. In the example described above, with the PCI bus used with a 32-bit processor, its data transfer rate is 16.7 times that of the ISA bus. Furthermore, the PCI bus has been used as the model for the Intel "Plug and Play" specification, which has eliminated the jumpers and switches used to set the configuration of ISA cards, with PCI cards being instead configured through the use of software.

Given an adequate supply of adapter cards of each type, the personal computer of FIGS. 1 and 2 can operate either with only ISA adapter cards 38 attached to the ISA bus 12 or with only PCI adapter cards 64 attached to the PCI bus 10. There is a particular advantage in connecting cards and peripheral devices (through cards) which require high data rates, such as audio, motion video, and graphics functions, to the PCI bus 12, while standard, lower-speed I/O functions are driven through the ISA bus 12. At any rate, present trends point toward increased usage of the PCI bus and toward decreased usage of the ISA bus. Eventually, the ISA bus may be eliminated. If this occurs, anyone buying an adapter card engaging the ISA bus may expect not to be able to use it when he eventually purchases a computing system having only the PCI bus. Therefore, what is needed is an adapter card which can be easily used with the ISA bus, and alternately with the PCI bus.

A number of examples of adapter cards which can alternately be plugged into two different bus architectures are found in the U.S. patent art. For example, U.S. Pat. No. 4,885,482 describes a first embodiment of such a card having edge connector tabs extending along opposite longitudinal card edges near opposite ends of the card. Differing types of card brackets are installable on the opposite ends of the card, with the appropriate bracket for a type of card (i.e. ISA or Micro Channel) being installed on the card end adjacent to the associated card edge connector. Thus, this embodiment of an adapter card is rotated 180 degrees about a central axis of rotation extending perpendicularly from the plane of a surface of the card. This embodiment does not include a provision for an end connector, and is thus suitable only for cards not requiring such connectors. A second embodiment of the card includes a single edge connector tab, for example of the ISA type, extending along a longitudinal edge, and a male-pin connector extending outward from an end of the card. This type of card is suitable for use in systems providing either the ISA bus or, alternately, the VMEbus. In a third embodiment, an edge connector tab extends from a single longitudinally-extending edge of the card near each end of the card, so that the card can be removed from one bus and rotated 180 degrees about a vertical axis of rotation before it is plugged into another bus. If a connector for an external cable is required, similar connectors must be placed at both ends of the card. The card bracket is mounted solely by means of screws extending into the bracket.

U.S. Pat. No. 5,163,833 describes a circuit card having edge connector tabs extending along opposite longitudinal card edges near the same end of the card, so that the circuit card can be flipped over to plug into either of two types of bus. A removable, repositionable connector board assembly is provided at this end of the card for mounting communications connectors to external cables in a position accessible from the back panel of the personal computer. The connector board assembly includes both the external connector(s) for cable connection(s) and an internal connector for electrical connection with the remaining portion of the circuit card. In the example shown, when the connector board assembly is repositioned, the bracket is changed between the type of bracket used with the ISA bus and the bracket used with the Micro Channel bus.

U.S. Pat. Nos. 4,885,482 and 5,163,833 further discuss electrical considerations, including a method for automatically determining which bus is plugged in and active, and operation in emulation modes.

What is needed is a circuit card which can be plugged into either of two types of busses with external cable connections being usable in the same way regardless of the type of bus to which the card is connected. It is further desirable to eliminate a requirement for additional connections between the circuit card and a separate connector board which is repositionable on the end of the circuit card after removal and rotation. Also, what is needed is a circuit card which can be used either in a conventional ISA slot, with an external cable connector being displaced in a first direction from the card, or in a conventional PCI slot, with an external cable connector being displaced opposite this first direction from the card.

SUMMARY OF THE INVENTION

In accordance with a first aspect of the invention there is provided a circuit card assembly for removable attachment to either a bus of a first type through a connector of a first type, or to a bus of a second type through a connector of a second type. The connector of a first type has associated therewith an access slot, in an adjacent slotted member, offset through a first offset distance in a first direction from an adjacent side of a card inserted within the connector of a first type. The connector of a second type has associated therewith an access slot, in an adjacent slotted member, offset through the first offset distance in a direction opposite the first direction from an adjacent side of a card inserted within the connector of a second type. The first offset distance is sufficient to allow adjacent placement of the connector of a first type and the connector of a second type on a system board. The slotted member additionally includes a bracket attachment surface. The connector of a first type includes a first card locating surface displaced at a second offset distance from the bracket attachment surface, wherein the connector of a second type includes a second card locating surface displaced at a third offset distance from the bracket attachment surface.

The circuit card assembly includes a circuit card, first and second connector structures, first and second connector engaging surfaces, a bracket mounting structure, and a bracket. The circuit card has parallel longitudinal edges extending between front and rear ends.

The first connector structure, which is for removably engaging the connector of a first type, extends along a first of the longitudinal edges, including a first connector locating surface engaging the first card locating surface when the first connector structure is fully engaged with the connector of a first type. The second connector structure, which is for removably engaging the connector of a second type, extends along a second of the longitudinal edges, including a second connector locating surface engaging the second card locating surface when the second connector structure is fully engaged with the connector of a second type. The first and second connector locating surfaces are separated by a first separation distance. The bracket mounting structure provides a mounting surface extending perpendicularly to a surface of the circuit card and extending perpendicularly to the parallel longitudinal edges thereof. The bracket includes an attachment feature for engaging the bracket attachment surface and is removably fastened to the bracket mounting structure and repositionable thereon at first and second bracket positions. The second bracket position is rotated 180 degrees on the mounting surface from the first bracket position about an axis of rotation extending perpendicularly from the mounting surface. This axis of rotation is offset from an adjacent side of the circuit card through the first offset distance, and along the surface of the card from the first connector locating surface by a distance equal to half a sum of the first separation distance and a difference between the second and third offset distances.

The bracket may be fastened to the bracket mounting surface by means of a number of fasteners which are symmetrical about orthogonal axes extending along the bracket mounting surface and through the axis of rotation. The bracket mounting structure may include a bracket or one or more I/O connectors mounted to extend from an adjacent side of the circuit card.

In accordance with another aspect of the invention, the bracket mounting structure includes a daughter card and a standoff mounting an adjacent side of the daughter card to extend at a fourth offset distance from the adjacent side of the circuit card. The bracket mounting structure is attached to the daughter card, and the axis of rotation is offset from the adjacent side of the daughter card through a distance which is a difference between the fourth and first offset distances.

BRIEF DESCRIPTION OF THE DRAWINGS

FIG. 6 is a rear elevation of a circuit card assembly built in accordance with a second embodiment of the present invention;

FIG. 7 is fragmentary side elevation of the circuit card assembly of FIG. 6;

FIG. 8 is a fragmentary side elevation of a circuit card assembly built in accordance with a third embodiment of the present invention;

FIG. 9 is a fragmentary plan view of the circuit card assembly of FIG. 8; and

FIG. 10 is a rear elevation of another version of the card assembly FIG. 3.

DESCRIPTION OF THE INVENTION

Figure 1:
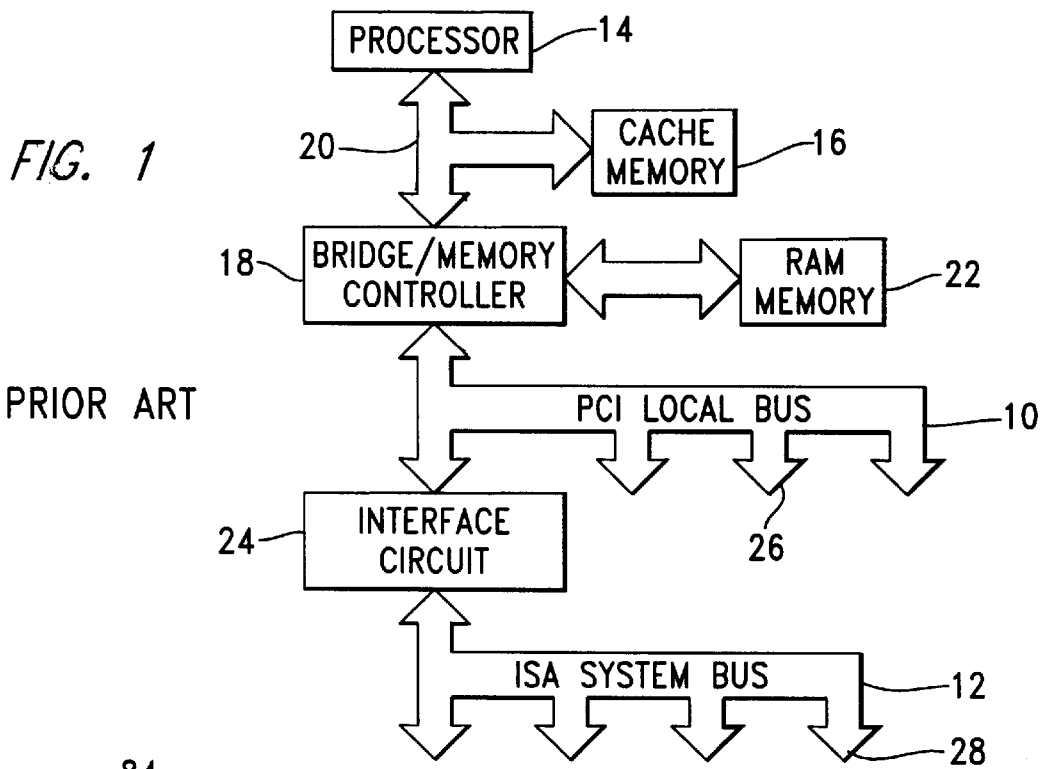
FIG. 1 is a block diagram of a prior-art personal computer including both a PCI local bus and an ISA system bus.
Figure 2:
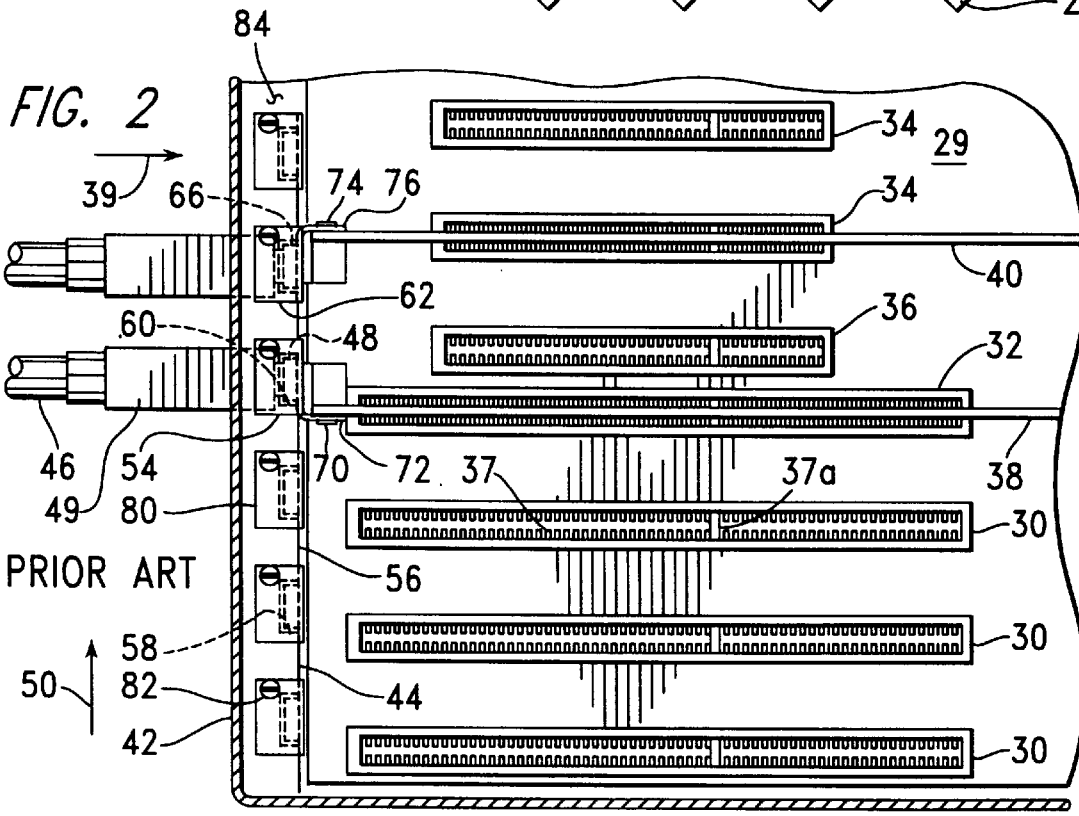
FIG. 2 is a fragmentary vertical cross-section of a prior-art computing system including the bus structure of FIG. 1.
Figure 3:
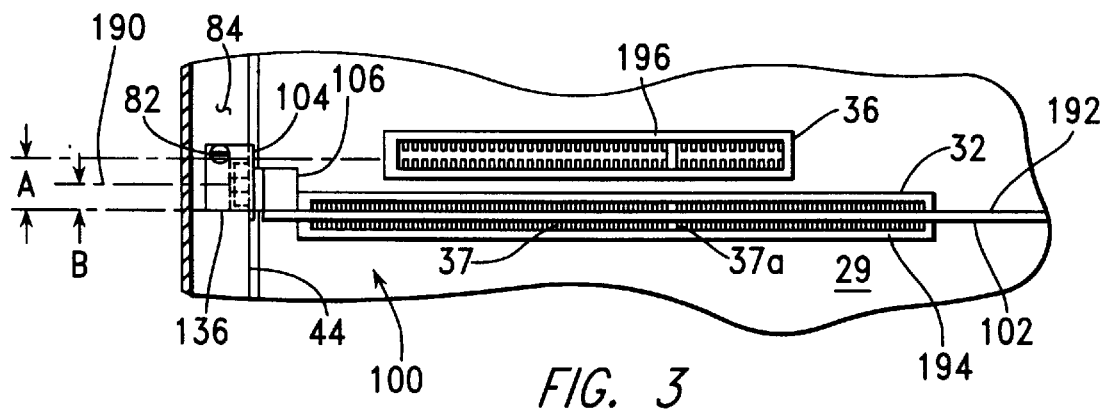
FIG. 3 is fragmentary vertical cross-section of a computing system including a circuit card assembly built in accordance with a first embodiment of the present invention.
Figure 4:
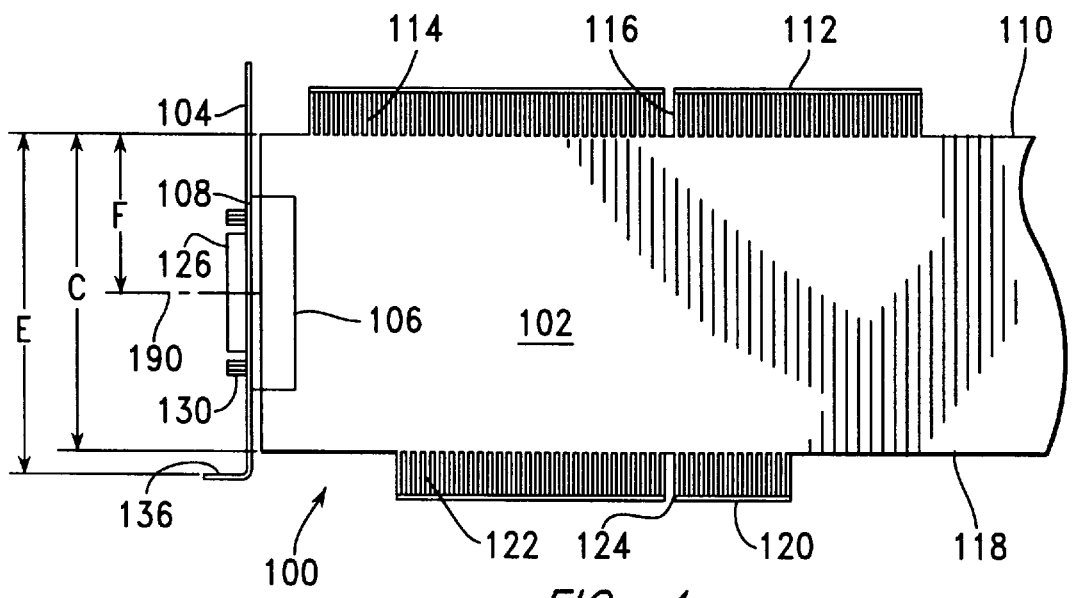
FIG. 4 is a fragmentary plan view of the circuit card assembly of FIG. 3.

FIG. 3 is a fragmentary vertical cross-section of a computing system including a circuit card assembly 100 built in accordance with a first embodiment of the present invention. Since various features of the computing system, such as the system board 29 and the slotted bracket 44, may be the same as those previously described in reference to FIG. 2, these features are accorded like reference numerals with those of FIG. 2. FIG. 4 is a fragmentary plan view of the circuit card 100, and FIG. 5 is a rear elevation thereof.

Figure 5:
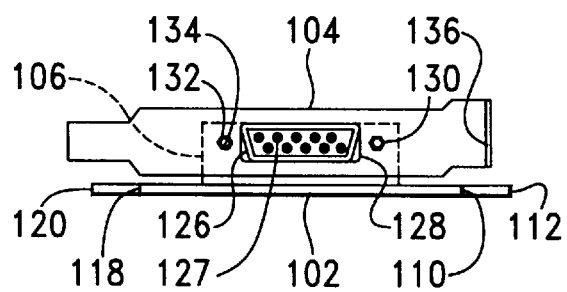
FIG. 5 is a rear elevation of the circuit card assembly of FIG. 4.
Figure 5:

Referring to FIGS. 3–5, a card assembly 100 includes a circuit card 102, a bracket 104, and an I/O connector 106, which serves as a bracket mounting structure for mounting the bracket 104 to a bracket mounting surface 108. The circuit card 102 includes a first longitudinal edge 110, from which a first connector structure in the form of an ISA card edge connector 112 extends as a tab, being configured for engagement with an ISA connector 32 on the system board 29. Thus, the ISA card edge connector 112 includes a plurality of conductive pads 114 for engaging contact springs 37 within the connector 32 and a slot 116 for extending over the key 37a of the connector 32. The conductive pads 114 are individually connected to various circuits (not shown) extending within and along the circuit card 102. The circuit card 102 also includes a second longitudinal edge 118, from which a second connector structure in the form of a PCI card edge connector 120 extends as a tab, being configured for engagement with a PCI connector 36 on the system board 29. The PCI card edge connector 120 similarly includes a plurality of conductive pads 122 and a slot 124.

The I/O connector 106, which may be a conventional device, includes an outward-extending shell 126 around a plurality of I/O connector terminals 127, which may be male or female types arranged for connection to an external cable 46 (shown in FIG. 2). The shell 126 extends through an aperture 128 in the bracket 104. The bracket 104 is held in place on the bracket mounting surface 108 of the I/O connector 106 by means of a pair of screwlocks 130, each of which includes an externally threaded portion (not shown) extending into a mating threaded hole (also not shown) extending into the I/O connector 106 from the bracket mounting surface 108. Each screwlock 130 also includes a hexagonal outer surface 132, for driving the externally threaded portion into engagement with the I/O connector 106, and an internally threaded hole 134 for engagement with a screw (not shown) extending from the cable connector 49 (shown in FIG. 2). The bracket 104 also includes a tab 136 extending adjacent a bracket attachment surface 84 of slotted bracket 44 for attachment thereto with a screw 82. The I/O connector 106 is fastened to the circuit card 102 by conventional means (not shown), such as rivets, screws, or formed metal tabs extending from the connector 106 to be soldered in place within holes in the circuit card 102. Also, conventional soldertails or tabs extending from the I/O connector 106 are electrically connected, generally also by means of solder, to provide electrical connections between the connector terminals 127 and circuits extending along or within the circuit card 102.

FIG. 6 is a rear elevation of a card assembly 140 forming a second embodiment of the present invention, and FIG. 7 is a fragmentary side elevation of this card assembly 140.

Referring to FIGS. 6 and 7, many adapter card assemblies do not require I/O connectors extending through their associated brackets. Such card assemblies are generally used with internal devices (within the covers of the computing system) such as CD-ROM (Compact Disk Read Only Memory) drives and other storage devices, so that connections to an external devices through external cables are not required. Thus, the card assembly 140 implements the present invention without a need to mount a bracket on an I/O connector. In this card assembly 140, the bracket 142 is instead fastened to the circuit card 144 by means of an mounting bracket 146, which provides a bracket mounting surface 148 to which the bracket 142 is fastened by means of screws 150. The mounting bracket 146 is in turn attached to the circuit card by means of a pair of screws 152 and nuts 154.

FIG. 8 is a fragmentary side elevation of a card assembly 160 built in accordance with a third embodiment of the present invention, and FIG. 9 is a fragmentary plan view thereof. This card assembly 160 includes a circuit card 162 and a daughter card 164, which are mechanically fastened together by means of screws 166 extending into standoffs 168. Various individual circuits within these cards 162, 164 are electrically connected through a pair of connectors 170. Daughter cards are used when the area required for circuits exceeds that which is available on the largest circuit card which can be fit in the desired area within the computing system, or when the logic can be partitioned, for example, so that a single circuit card can be used with a number of different daughter cards to provide various desired functions.

The circuit card 162 includes a first longitudinal edge 172, from which a first connector structure in the form of an ISA card edge connector 174 extends as a tab. The circuit card 162 additionally includes a second longitudinal edge 176, from which a second connector structure in the form of a PCI card edge connector 178 extends as a tab. The I/O connector 180, which may again be a conventional device, includes an outward extending shell 182, which extends through an aperture (not shown) in the bracket 184. The bracket 184 is held in place on a bracket mounting surface 186 of the I/O connector 180 by means of a pair of screwlocks 188. The I/O connector 180 is connected to to the daughter card 164 by conventional means, such as rivets, screws, or formed metal tabs extending from the connector 180 to be soldered in place within holes in the daughter card 164. This arrangement places the connector 180 in the same position relative to the circuit card 162 as the connector 106 relative to the circuit card 102 in the card assembly 100, discussed above relative to FIGS. 3–5.

As shown in the examples of the FIGS. 3–9, the embodiments 100, 140,160 are each configured for engagement with an ISA bus connector 32. The first embodiment 140 is readily reconfigured for engagement with a PCI bus connector 36 by removing screwlock fasteners 130, by removing the bracket 104 from the connector 106, by rotating the bracket 104 about an axis of rotation 190, and by fastening the bracket 104 onto the bracket mounting surface 108 of the I/O connector 106 by means of the screwlock fasteners 130. The axis of rotation 190 is not described as allowing the actual rotation of the bracket 104 in contact with the bracket mounting surface 108, as this is prevented by the shell 126 extending through an aperture 128 in the bracket 104. The axis of rotation 190 is instead described as a concept which is implemented through the location of the screwlock fasteners 130, and of the holes (not shown) within the bracket 104 through which these fasteners 130 extend. These fasteners 130 are arranged in a pattern which is symmetrical about perpendicular lines of symmetry extending along the bracket mounting surface 108.

The offset distance of the axis of rotation 190 from an adjacent side 190 of the circuit card 102 will now be discussed, with reference being made to FIGS. 2 and 3. As previously described in reference to FIG. 2, the configuration of PCI connector 36 has been arranged to allow the placement of either an ISA card assembly 38 or a PCI card assembly 40 in adjacent bus connectors 32, 36, with a bracket forming part of either of the card assemblies being in alignment with a single associated slot 60. Thus, if A is the distance between an adjacent side 192 of the circuit card 102 (i.e. a side adjacent to the connector 106) when this circuit card 102 is inserted in the ISA connector 32 and the same side 192 when the circuit card 102 is inverted and plugged into the adjacent PCI connector 36, the distance B between the adjacent side 192 and the axis of rotation 190, must be half the distance A. This condition is necessary to return the bracket 104 to the same position whether the card assembly 100 is configured for attachment to the ISA connector 32 or the PCI connector 36.

The position of the axis of rotation 190 along the surface of the card 102 between the connectors 112, 120 will now be considered with reference to FIGS. 2 and 4. Since the connectors 112, 120 are of different types, it is possible, in a general case, that the daughter card 102 may be inserted more deeply within one of them than within the other. Whatever the type of connector, there is a card locating surface which stops movement of the card into the connector by contacting a connector locating surface forming part of the card. In the example of FIG. 3, card 102 includes a first connector locating surface in the form of longitudinal edge 110, which contacts an outward facing surface 194 of the ISA connector 32, and a second connector locating surface in the form of longitudinal edge 118, which contacts an outward facing surface 196 of the PCI connector 36.

In the card assembly 100, the distance between longitudinal edges 110,118 is indicated as C, and the distance between the first longitudinal edge 110 and the bracket tab 136, which is configured for attachment to a bracket mounting surface 84 forming part of the slotted bracket 44 when the ISA connection tab 112 is fully inserted within the ISA connector 32 is indicated as E. The distance C is taken from a computer system for which the card assembly 103 is to be inserted, or from specifications for ISA cards. This distance E is taken to be the offset distance between the bracket mounting surface 84 and the card locating surface 194 of a connector. A similar distance E' is taken to be the offset distance between the bracket mounting surface 84 and an upper surface 196 of the PCI connector 36. The distance from the first longitudinal edge 110 and the axis of rotation 190, which is indicated as F, is determined by adding the difference between E and E' to the distance C, and by dividing the result by two. Thus, in the special case in which the distances E and E' are equal, the axis of rotation 190 extends midway between the longitudinal edges 110, 118.

Referring again to FIG. 9, the location of an axis of rotation 198 between the longitudinal edges 172 and 176 of card 162 within circuit card assembly 160 is as described above for the location of the axis 190.

Referring again to FIG. 8, the displacement, indicated as distance B, of the axis of rotation 198 from the circuit card 162 of the third embodiment of the present invention is determined in the same manner as the distance B describe above in reference to FIG. 3. The distance F, being taken from the adjacent surface 200 of the daughter card on which the connector 180 is mounted, is thus the difference between the distance G, which is the distance between the adjacent surfaces of the cards 162, 164, and the distance B. In the case of standard connections with the ISA and PCI busses, the distance G between cards can easily be established so that the distance G is twice the distance B, allowing the same I/O connectors to be used in the first and third embodiments of the present invention.

Referring again to FIGS. 6 and 7, the axis of rotation 202 of the circuit card assembly 140 is located from the adjacent surface 204 of the circuit card 144 and between the longitudinal edges 204, 208 in the manner described above in reference to FIGS.3 and 4 for the location of axis of rotation 190. In the circuit card assembly 140, there are no I/O connectors, so the axis or rotation 190 is used only to locate fasteners so that the bracket 142 can be fastened in positions rotated 180 degrees from one another while the bracket 142 remains in a proper location as the circuit card 144 is inserted in either connector 32, 36 (shown in FIG. 3).

Requirements of each of the embodiments of the present invention for symmetry along the bracket mounting surface will now be discussed in reference to FIG. 10, which is a rear view of a version of the first embodiment of the present invention. To meet the requirements of the present invention, both the fasteners used to fasten the bracket to the bracket mounting surface and the I/O connectors (if any) extending through the brackets must each be symmetrical to first and second axes of symmetry extending perpendicularly to one another along the bracket mounting surface and through the axis of rotation, defined as described above. In the example of FIG. 10, the I/O connectors 210 form a pattern which is symmetrical about orthogonal axes 212,214, while the fasteners 215 form a pattern which is symmetrical about orthogonal axes 216, 218. Both of these pairs of axes intersect at the axis of rotation 220. This pattern allows rotation of the bracket 222 as required by the present invention.

Referring again to FIG. 5, while exact symmetry of the pattern of connector(s) is desirable, it is not required, since the aperture, such as aperture 128 can be configured to accept the connector shell, in this case shell 126, without fitting tightly around the shell.

While the card assemblies 100, 140, 160 have been described as fitting within a computing system having both ISA and PCI connectors on a system board, it is understood that such card assemblies are also usable on system units providing only the ISA bus or only the PCI bus. It is further understood that the features of the present invention could also be applied to other types of busses.

A card assembly built in accordance with the present invention has the advantage over the prior art in that additional I/O connectors and intermediate connections to I/O connectors are not required. The same I/O connector is used, being soldered in place within the card assembly, regardless of the orientation of the card within the computing system.

While the invention has been described in its preferred forms or embodiments with some degree of particularity, it is understood that this description has been given only by way of example, and that numerous changes in the details of construction, fabrication, and use, including the combination and arrangement of parts, may be made without departing from the spirit and scope of the invention.

What is claimed is:

1. A circuit card assembly for removable attachment to either a bus of a first type through a connector of a first type, having a first card locating surface engaging a circuit card fully inserted into said connector of a first type, and to a slotted bracket of a first type adjacent said connector of a first type, with said slotted bracket of a first type including an access slot offset through a first offset distance in a first direction from an adjacent side of a card inserted within said connector of a first type, or to a bus of a second type through a connector of a second type, having a second card locating surface engaging a circuit card fully inserted into said connector of a second type, and to a slotted bracket of a second type adjacent said connector of a second type, with said slotted bracket of a second type including an access slot offset through said first offset distance in a direction opposite said first direction from an adjacent side of a card inserted within said connector of a second type, bracket of a first type and said slotted bracket of a second type each additionally including a bracket attachment surface, with said first card locating surface being displaced at a second offset distance from said bracket attachment surface of said slotted bracket of a first type, with said second card locating surface being displaced at a third offset distance from said bracket attachment surface of said slotted bracket of a second type, and with said circuit card assembly comprising:

a circuit card having parallel longitudinal edges extending between front and rear ends;

a first connector structure for removably engaging said connector of a first type, extending along a first of said longitudinal edges, including a first connector locating surface engaging said first card locating surface;

a second connector structure for removably engaging said connector of a second type, extending along a second of said longitudinal edges, including a second connector locating surface engaging said second card locating surface wherein said first and second connector locating surfaces are separated by a first separation distance;

a bracket mounting structure providing a mounting surface extending perpendicularly to a surface of said circuit card and extending perpendicularly to said parallel longitudinal edges thereof; and a bracket including an attachment feature for engaging said bracket attachment surface, wherein said bracket is removably fastened to said bracket mounting structure and repositionable thereon at first and second bracket positions, wherein said second bracket position is rotated 180 degrees on said mounting surface from said first bracket position about an axis of rotation extending perpendicularly from said mounting surface, wherein said axis of rotation is offset from an adjacent side of said circuit card through said first offset distance, and wherein said axis of rotation is offset along said surface of said card from said first connector locating surface by a distance equal to half a sum of said first separation distance and a difference between said second and third offset distances.

2. The circuit card assembly of claim 1, wherein
   said second and third offset distances are equal, and
   said axis of rotation is displaced along said adjacent side of said circuit card at a midpoint between said first and second connector locating surfaces.

3. The circuit card assembly of claim 1, wherein
   said bracket is fastened to said bracket mounting surface by means of a plurality of fasteners extending in a pattern which is symmetrical about first and second axes of symmetry extending through said axis of rotation along said bracket mounting surface,
   and said first and second axes of symmetry are perpendicular to one another.

4. The circuit card assembly of claim 3, wherein said bracket mounting structure includes a bracket mounted to extend from said adjacent side of said circuit card.

5. The circuit card assembly of claim 3, wherein
   said bracket mounting structure includes an I/O connector mounted to extend from said adjacent side of said circuit card,
   said bracket includes an aperture which is symmetrical about third and fourth axes of symmetry extending through said axis of rotation and perpendicular thereto,
   said third and fourth axes of symmetry are perpendicular to one another, and
   said I/O connector includes an outward-extending connection structure extending through said aperture.

6. The circuit card assembly of claim 5, wherein said I/O connector is non-removably attached to said circuit card.

7. The circuit card assembly of claim 3, wherein
   said bracket mounting structure includes a plurality of I/O connectors mounted to extend from said adjacent side of said circuit card, said bracket includes a plurality of apertures extending in a pattern which is symmetrical about third and fourth axes of symmetry extending through said axis of rotation and perpendicular thereto, said third and fourth axes of symmetry are perpendicular to one another, and said I/O connectors include outward-extending connection structures extending through said aperture.

8. The circuit card assembly of claim 7, wherein said I/O connectors are non-removably attached to said circuit card.

9. The circuit card assembly of claim 1, wherein said bracket mounting structure includes a daughter card and a standoff mounting an adjacent side of said daughter card to extend at a fourth offset distance from said adjacent side of said circuit card;

said bracket mounting structure is attached to said daughter card; and said axis of rotation is offset from said adjacent side of said daughter card through a distance which is a difference between said fourth and first offset distances.

10. The circuit card assembly of claim 9, wherein said bracket is fastened to said bracket mounting surface by means of a plurality of fasteners extending in a pattern which is symmetrical about first and second axes of symmetry extending through said axis of rotation along said bracket mounting surface, and said first and second axes of symmetry are perpendicular to one another.

11. The circuit card assembly of claim 10, wherein said bracket mounting structure includes a bracket mounted to extend from said adjacent side of said daughter card.

12. The circuit card assembly of claim 10, wherein said bracket mounting structure includes an I/O connector mounted to extend from said adjacent side of said daughter card, said bracket includes an aperture which is symmetrical about third and fourth axes of symmetry extending through said axis of rotation and perpendicular thereto, said third and fourth axes of symmetry are perpendicular to one another, and said I/O connector includes an outward-extending connection structure extending through said aperture.

13. The circuit card assembly of claim 12, wherein said I/O connector is non-removably attached to said circuit card.

14. The circuit card assembly of claim 10, wherein said bracket mounting structure includes a plurality of I/O connectors mounted to extend from said adjacent side of said circuit card, said bracket includes a plurality of apertures extending in a pattern which is symmetrical about third and fourth axes of symmetry extending through said axis of rotation and perpendicular thereto, said third and fourth axes of symmetry are perpendicular to one another, and said I/O connectors include outward-extending connection structures extending through said aperture.

15. The circuit card assembly of claim 14, wherein said I/O connectors are non-removably attached to said circuit card.

* * * * *